(12) United States Patent
Paradie et al.

(10) Patent No.: US 10,317,511 B2
(45) Date of Patent: Jun. 11, 2019

(54) SYSTEMS AND METHODS FOR SYNCHRONIZING PROCESSOR OPERATIONS OVER A COMMUNICATIONS NETWORK

(71) Applicant: Veoneer US, Inc., Southfield, MI (US)

(72) Inventors: Michael Paradie, Hollis, NH (US); Sushma Murthy, Westford, MA (US); Andrew Ditchfield, New Hudson, MI (US)

(73) Assignee: Veoneer US, Inc., Southfield, MI (US)

( * ) Notice: Subject to any disclaimer, the term of this patent is extended or adjusted under 35 U.S.C. 154(b) by 387 days.

(21) Appl. No.: 15/352,089

(22) Filed: Nov. 15, 2016

(65) Prior Publication Data

US 2018/0136311 A1 May 17, 2018

(51) Int. Cl.
*G01S 7/02* (2006.01)
*G01S 13/93* (2006.01)

(52) U.S. Cl.
CPC .......... *G01S 7/023* (2013.01); *G01S 13/931* (2013.01)

(58) Field of Classification Search
CPC ........ G01S 13/931; G01S 7/023; G01S 13/02; G01S 13/0209; G01S 13/22; G01S 13/284; G01S 13/86; G01S 15/02; G01S 17/02; G01S 2007/2886; G01S 2013/9325; G01S 2013/9346; G01S 2013/935; G01S 2013/9353; G01S 2013/936; G01S 2013/9375; G01S 2013/9378; G01S 2013/9389; G01S 7/2813; G01S 7/36; G01S 7/40; H04J 3/0664; H04J 3/0644; H04J 3/0658; H04J 3/0667; H04J 3/0673; H04J 3/0682; H04J 3/10; H04J 3/12; H04L 12/403; H04L 2012/40215; H04L 12/40; H04L 2012/40273; H04L 7/0087;
(Continued)

(56) References Cited

U.S. PATENT DOCUMENTS 6,888,491 B2   5/2005   Richter
7,439,903 B2  10/2008   Watanabe et al.
(Continued)

OTHER PUBLICATIONS

Search Report issued in corresponding International Application No. PCT/US17/61668, dated Jan. 25, 2018.

*Primary Examiner* — Kashif Siddiqui
(74) *Attorney, Agent, or Firm* — Burns & Levinson LLP; Steven M. Mills

(57) ABSTRACT

The systems and methods of the present disclosure utilize an advantageous data transmission protocol, which facilitates determining and compensating for transmission delay between nodes in a communications network in order to correlate timing information across multiple nodes. According to the systems and methods presented herein, data may be transmitted from a first node to a second node, wherein the transmitted data includes each of (i) timing information (as measured by a first timing mechanism associated with the first node) characterizing a first set of data and (ii) a transmission time (as also measured by the first timing mechanism). A receiving time (as measured by a second timing mechanism associated with the second node) for the first set of data, may also be determined. Based on these parameters timing information characterizing the first set of data in the context of the second timing mechanism may then be determined.

18 Claims, 4 Drawing Sheets

(58) Field of Classification Search
CPC ............ B60R 2021/0027; B60R 21/00; B60R 2300/302; G08G 1/01; G08G 1/162; G08G 1/166; H04W 56/0015
See application file for complete search history.

(56) References Cited

U.S. PATENT DOCUMENTS

| | | |
|---|---|---|
| 2006/0083264 A1 | 4/2006 | Jordan |
| 2009/0132118 A1* | 5/2009 | Takeda .............. H04L 12/40013 701/36 |
| 2012/0127874 A1* | 5/2012 | Oh .................... H04W 74/0833 370/252 |
| 2012/0140861 A1 | 6/2012 | Menon |
| 2013/0241766 A1 | 9/2013 | Kishigami et al. |
| 2014/0029604 A1 | 1/2014 | Nicholls et al. |
| 2015/0254781 A1 | 9/2015 | Binion et al. |
| 2016/0277136 A1 | 9/2016 | Jin et al. |
| 2018/0145823 A1* | 5/2018 | Seo ..................... H04L 43/0858 |

* cited by examiner

SYSTEMS AND METHODS FOR SYNCHRONIZING PROCESSOR OPERATIONS OVER A COMMUNICATIONS NETWORK

TECHNICAL FIELD

The present disclosure is related to correlating processor timing for a plurality of processors over a communications network such as a vehicle-related communication network and more particularly to achieving a precise time synchronization between operations of two or more processors based on such correlation.

DISCUSSION OF RELATED ART

In automotive radar systems, multiple radar sensors can be mounted to a host vehicle. Each radar sensor includes a transmitter for transmitting radar signals into a region of interest adjacent to the vehicle and a receiver for receiving return radar signals from objects in the region of interest. Processing circuitry in each sensor processes the received return radar signals to detect various target objects (such as other vehicles) and determine range, bearing and/or velocity of the objects. In operation, it may be important to synchronize operation of each of the radar sensors so as to prevent interference between different sensors. Thus, for example, it may be important to communicate timing information for the transmission cycle of a first radar sensor to a second radar sensor. This information is typically communicated over a communications network.

The particular problem that motivated the present disclosure, involves the occurrence of radio-frequency interference between two radar sensors mounted on the same automotive vehicle. The two radar sensors transmit similar waveforms for which their mutual interference could be eliminated by offsetting the start of one sensor's transmission cycle with respect to the other. This requires, however, that one sensor (e.g., the slave sensor) have precise knowledge of the timing of the other sensor's (e.g., the master sensor's) transmission cycles. For this particular interference problem, the notional accuracy required for synchronization might be +/−0.5 ms (milliseconds) or better.

In automotive vehicles, radar sensors typically communicate over an automotive CAN bus that is typically shared with other electronic control units (ECUs) in the vehicle. Precise synchronization using CAN bus communications is made difficult by several factors:

Transmissions on the CAN bus are typically based strictly on message priority, as determined by the value of the message ID. The CAN bus implements a collision-less protocol which guarantees if two ECU's are ready to transmit a message, then the message with the smallest message ID value will be transmitted first. This means that it is generally desirable to have a high-priority message on the CAN bus so that your message is usually transmitted first. The CAN bus owner, however, must balance the needs of all bus participants which means that it is desirable for a synchronization method not to require obtaining a high-priority CAN message ID for synchronization purposes.

Once the transmission of a message on the CAN bus of any priority begins, it cannot be preempted by a higher-priority message, which must wait until the transmission is complete. This means that even high-priority CAN messages will experience some variability in delay before transmission. The variability may generally depend on CAN bus loading (i.e., the percentage of the time during which CAN messages are being transmitted on the bus), as well as the bit-rate speed of the CAN bus. At high bus loadings, it may often be the situation that CAN bus participants are made to wait before transmitting their messages. For lower CAN-bus speeds, the transmission of a message will also require longer time, meaning that the average wait before transmission will be longer.

A typical automotive low-speed CAN bus operates at 33.33 kilobits per second. Assuming a typical large message on the bus may require the transmission of 108 bits, this means that even the highest-priority message may need to wait as long as 3.24 ms (i.e., =108 bits divided by 33.33E3 bit/sec). This wait time alone exceeds the aforementioned notional synchronization accuracy of +/−0.5 ms. The situation gets worse when one considers the conditions of high bus loading and use of a lower-priority CAN message for achieving synchronization.

There is therefore a need for improved systems and methods for facilitating synchronizing processor operations for a plurality of processors via a communications network such as a CAN bus. These and other needs are met by way of the present disclosure.

SUMMARY

Systems and methods are presented herein for facilitating synchronizing processor operations for a plurality of processors via a communications network.

In example embodiments, a system is provided for synchronizing processor operations over a vehicle-related communication network. The system may include a first communication node associated with a first processor characterized by a corresponding first timing mechanism; and a second communication node associated with a second processor characterized by a corresponding second timing mechanism, wherein at least one of the first and second communication nodes of the vehicle-related communication network is associated with an embedded system in a vehicle. Advantageously, the first processor may be configured to transmit data from the first communication node to the second communication node, wherein the transmitted data includes each of (i) timing information characterizing a first set of data, as measured by the first timing mechanism and (ii) a transmission time for the first set of data, as measured by the first timing mechanism. Moreover, the second processor may be configured to (i) receive the transmitted data and determine a receiving time for the first set of data, as measured by the second timing mechanism (ii) based on the timing information characterizing the first set of data in the context of the first timing mechanism and the transmission time for the first set of data, calculate a transmission delay time for the first set of data and (iii) based on the transmission delay time and the receiving time for the first set of data, determine timing information characterizing the first set of data in the context of the second timing mechanism, thereby correlating timing information for the first set of data between the first and second timing mechanisms. In some embodiments, the vehicle-related communications network may be a CAN or LIN bus.

Similarly, in example embodiments, a method is provided for synchronizing processor operations over a vehicle-related communication network. In such embodiments, the communications network may include a first communication node associated with a first processor characterized by a corresponding first timing mechanism and a second communication node associated with a second processor characterized by a corresponding second timing mechanism, wherein at least one of the first and second communication nodes of the vehicle-related communication network is associated with an embedded system in a vehicle. Thus, the method may include, e.g., transmitting data from the first communication node to the second communication node, wherein the transmitted data includes each of (i) timing information characterizing a first set of data, as measured by the first timing mechanism and (ii) a transmission time for the first set of data, as measured by the first timing mechanism; receiving the transmitted data at the second node and determining a receiving time for the first set of data, as measured by the second timing mechanism; based on the timing information characterizing the first set of data in the context of the first timing mechanism and the transmission time for the first set of data, calculating a transmission delay time for the first set of data; and based on the transmission delay time and the receiving time for the first set of data, determine timing information characterizing the first set of data in the context of the second timing mechanism, thereby correlating timing information for the first set of data between the first and second timing mechanisms.

In example embodiments related to the system and method described above, the timing information characterizing the first set of data may be sent in a first communication between the first communication node and the second communication node. Notably, the transmission time for the first set of data, may be characterized as a transmission time for the first communication. Thus, in some embodiments, the transmission time for the first communication is sent in a second communication between the first communication node and the second communication node.

In further example embodiments related to the system and method described above, the first set of data may represent sensor data from a first sensor. Thus, in some embodiments, determining the timing information characterizing the first set of data in the context of the second timing mechanism may time-correlate the sensor data from the first sensor to sensor data from one or more additional sensors so as to enable fusion processing thereof. In this way, the system/method may further be configured to implement fusion processing of the time-correlated sensor data from the first sensor and the one or more additional sensors.

In further example embodiments related to the system and method described above, changes in the correlation of timing information between the first timing mechanism and the second timing mechanism are tracked over a plurality of communications so as to determine relative clock drift. Notably, this relative clock drift may be accounted for during processing. Clock drift may then be compensated for when time-correlating data and or synching operations between a plurality of nodes. Effectively, correlation of timing information may be used to predictively model future correlations. This may advantageously, enable use of less expensive timing mechanisms.

In further example embodiments related to the system and method described above, the first set of data may represent transmission cycle timing information for a first sensor. Thus, in some embodiments, determining the timing information characterizing the first set of data in the context of the second timing mechanism may enable comparing a transmission cycle for a second sensor relative to the transmission cycle of the first sensor. In this way, the system may be advantageously configured to adjust the transmission cycles of one or more of the sensors in order to mitigate interference.

In further example embodiments related to the system and method described above, the correlated timing information may be utilized by the system to synch or otherwise control timing of a plurality ECUs across the communication network, so as to effect cooperative operation between the plurality of ECUs or so as to prevent interfering operation between the plurality of ECUs. In yet further example embodiments related to the system and method described above, the correlated timing information may be utilized by the system to time-correlate data from a plurality of nodes. In yet further example embodiments related to the system and method described above, the correlated timing information may be utilized by the system to time-correlating proximity detection data from a plurality of sensors. In yet further example embodiments related to the system and method described above, the correlated timing information may be utilized by the system to evaluating the operation of one of the timing mechanisms and to compensate for such operation.

Figure 1:
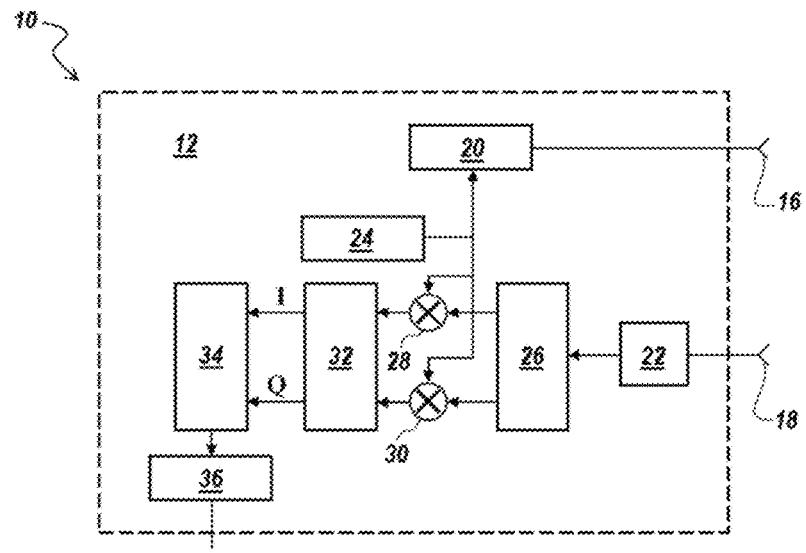
FIG. 1 depicts a schematic block diagram of an example automotive radar system, according to the present disclosure.

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Systems and methods are provided herein for synchronizing processor operations for a plurality of processors via a communications network such as a vehicle-related communication network.

As used herein, a "vehicle-related communications network" may generally refer to a communications network where at least one of the communication nodes is associated with an embedded system in a vehicle. Note that a vehicle-related communications network can include some combination of inter-vehicle (between multiple vehicles) communications, extra-vehicle (between a vehicle and a non-vehicle) communications and/or intra-vehicle (within a vehicle) communications.

In some embodiments, a vehicle-related communications network may be a "vehicular communications system" which as used herein may generally refer to a network including inter-vehicle and/or extra-vehicle communications. Thus, for example, a vehicular communications system may include some combination of vehicle-to-vehicle (V2V) communications, a vehicle-to-roadside (V2R) communications, and/or vehicle to internet (V2I) communications. Examples of vehicular communications systems include Vehicular Ad Hoc Networks (VANETs) such as General Motors' V2V system and Mercedes Car-to-X system.

In other embodiments, a vehicle-related communication network may include a vehicular bus for intra-vehicle communications. As used herein, a "vehicle bus" may generally refer to a specialized internal communications network that interconnects components inside a vehicle. Examples of a vehicle bus include a Controller Area Network (CAN), a Local Interconnect Network (LIN), a computer networking technology based network such as an Ethernet or TCP/IP network or the like.

As used herein, a "communication node" may generally refer to a connection point, a redistribution point, or a communication endpoint along a network. A communication node may be configured to function as a transmitter, receiver or both a transmitter and receiver. Typically, a node may be associated with a respective central processing unit (CPU)/processor for that node. The CPU/processor may further be characterized by a corresponding clock or other timing mechanism which may advantageously provide a relative temporal point of reference specific to the CPU/processor for processing by the CPU/processor. Thus, in some embodiments, each of a first communication node and a second communication node may be associated with respective CPUs/processors and respective timing mechanisms. Notably, in such embodiments, synchronization may be needed to accurately relate temporal information between the first and second nodes (since each timing mechanism is distinct).

As noted above, in the context of a vehicle-related communication network at least one of the communication nodes is associated with an embedded system in a vehicle. As used herein, an "embedded system" may generally refer to a computer system with a dedicated function within a larger mechanical or electrical system such as a vehicle. Embedded systems may typically include a processing unit such as a microcontroller or microprocessor. As noted above, the processing unit may be characterized by a corresponding timing mechanism.

In some embodiments, an embedded system in a vehicle may be an electronic control unit (ECU). As used herein, "electronic control unit" is generally a generic term for any embedded system that controls one or more of the electrical system or subsystems in a vehicle. In example embodiments, the ECU may be associated with a sensor for detecting or otherwise creating an event. For example, in some embodiments, the ECU may be associated with a radar system, (Light Detection And Ranging) LIDAR system, camera based detector system, or some other proximity detection system for determining a relative range and/or position of a target object relative to the vehicle. In some embodiments, such as for LIDAR and RADAR systems, operation of the sensor may include both transmitting and receiving of a signal. Thus, in such embodiments, event information may be detected/created for one or both of the operations (for example, an ECU for a radar system may be configured for creating event information corresponding to radar transmission such as transmission cycle information and event information based on a received radar signal, such as a proximity alert relating to a target object). In general, event information may be detected/created reflective of any operation of the ECU. Notably, the systems and methods of the subject application advantageously enable correlating such event information across multiple ECU's.

It should be noted that many of the example embodiments herein are described and/or illustrated with respect a CAN bus type communication network. As discussed above, a CAN bus, involves a priority transmission based system where higher priority communications are transmitted with priority over lower priority communications. This inevitably leads to communications being subject to variable time delays and in some instances may even result in anachronic communications. Moreover, since (1) priority ranking for a communication is largely contingent on the presence or absence of other communications having a higher priority and (2) these other communications may be event-triggered, rendering the presence or absence of such unpredictable, the resulting time delay for a given communication is likewise often completely unpredictable for a CAN bus. As noted above, it is this non-deterministic nature of the system that makes synchronization of communications over a CAN bus extremely difficult.

It will be appreciated that the systems and methods presented herein advantageously enable synchronization of communication over both complex non-deterministic communications systems such as CAN buses as well as over simpler communication systems which do not exhibit variable time delay. It will further be appreciated that while various exemplary embodiments presented herein may be described and/or illustrated with respect to a specific communication network such as a CAN bus, the systems and methods are not limited to such embodiments and the described synchronization techniques maintain general applicability with respect to any vehicle-related communications network (and, more generally, any communication network). Moreover, while the systems and methods provided herein maintain general applicability, specific additional advantages are provided with respect to communications systems which are non-deterministic, e.g., with respect to triggering a communication (such as where a communication is triggered by a detected event) and/or with respect to communication delay (such as where a communication is subject to a variable and unpredictable time delay between when the communication is triggered and the communication is actually transmitted to/received by a receiving node).

In example embodiments, systems and methods are presented for synchronizing communications over a vehicle-related communication network. In particular, an exemplary system may include at least a first communication node associated with a first processor and a second communication node associated with a second processor, wherein at least one of the communication nodes represents an embedded system in a vehicle such as an electronic control unit associated with a first sensor. Notably, the first and second processors may be characterized by respective first and second timing mechanisms. As noted above, the first and second timing mechanisms are typically unsynchronized and potentially inaccurate and therefore timing information as reflected by the first and second timing mechanisms may be subject to variation. Accordingly, it is advantageous to correlate timing information between the first and second timing mechanisms. The systems and methods of the present disclosure advantageously enable such correlation of timing information across multiple nodes.

This correlated timing information may serve multiple purposes. For example, in some embodiments, the correlated timing information may be utilized to facilitate synching operations/controlling timing of a plurality ECUs across the communication network. This may be utilized to effect cooperative operation between the plurality of ECUs (e.g., where the function of one ECU contributes to the function of another ECU) and/or to prevent interfering-type operation between the plurality of ECUs (e.g., where the function of one ECU interferes with the function of another ECU). For example, in the context of ECUs that are configured for transmitting potentially interfering radio frequency RF or other electro-magnetic radiation EMR signals (such as ECUs associated with radar and/or LIDAR systems, it may be advantageous to control the timing, e.g., offset, transmission cycles for each of a plurality of ECUs so as to prevent destructive interference. Thus, correlated timing information for processors associated with each of a first transmitter associated with a first ECU and a second transmitter associated with a second ECU may be utilized to correlate respective transmission cycles for the transmitters and stagger such transmission cycles so as to minimize electromagnetic interference (EMI) or radio-frequency interference (RFI) between the transmitters. In alternative embodiments synching operations may be used to provide cooperative functionality between ECUs. For example, the correlated timing information may serve to improve the quality of highly time-perishable data, such as host vehicle dynamics data. This dynamics data may, for example, provide information regarding the turn rate and/or acceleration of the host vehicle. Note that the host vehicle may be undergoing changing maneuvers and that data describing these maneuver dynamics may be transmitted through one or more communication busses, each introducing unknown and potentially variable time delays, before being received by an ECU requiring this information. The usefulness of this data can be greatly diminished due to the unknown and potentially variable age of said dynamics data.

In further example embodiments, correlation of timing information across multiple nodes may be utilized to facilitate time-correlating data from a plurality of nodes. In particular, correlated timing information may enable fusion processing of time-correlated data from a plurality of communication nodes. For example, data from a first ECU may be time-correlated and considered in conjunction with data from a second ECU. This may be particularly useful, e.g., with respect to time-correlating proximity detection data from a plurality of sensors, such as for tracking changes in position of a target object relative to the vehicle.

In yet further example embodiments, correlation of timing information across multiple nodes may be utilized to facilitate evaluating the operation of a timing mechanism and compensating for such operation. For example, correlated timing information may be tracked to determine a relative clock drift between a first timing mechanism associated with a first processor and a second timing mechanism associated with a second processor. Clock drift may then be compensated for when time-correlating data and or synching operations between a plurality of nodes. Effectively, correlation of timing information may be used to predictively model future correlations. This may advantageously, enable use of less expensive timing mechanisms.

The systems and methods of the present disclosure utilize an advantageous data transmission protocol, which facilitates determining and compensating for transmission delay between nodes in order to correlate timing information across multiple nodes. Thus, as noted above, the systems and methods are particularly useful with respect to communications networks which are non-deterministic such as CAN buses and where transmission delays are somewhat variable and unpredictable. According to the systems and methods presented herein, data may be transmitted from a first communication node to a second communication node, wherein the transmitted data includes each of (i) timing information characterizing a first set of data, as measured by a first timing mechanism for a first processor associated with the first node and (ii) a transmission time for the first set of data, as measured by the first timing mechanism. In example embodiments, the first set of data as well as the timing information characterizing the first set of data may be transmitted in a first communication, while the transmission time for the first set of data may be transmitted in a second and follow-up communication. This messaging protocol works well with CAN busses where although transmission delay is variable, various techniques can be utilized to determine transmission completion time (e.g., such as the generation of a transmission complete event which can be observed at the transmitting node). Furthermore, in some embodiments, the second communication may be utilized to send both the transmission time for the first set of data, e.g., for the first communication, as well as to send timing information characterizing a second set of data, as measured by the first timing mechanism. Thus, in essence each communication may include, for example, a set of data, timing information characterizing that set of data, and a transmission time for the previous communication. In this way, communications may be optimized to reduce the overall load on the communications network.

According to the systems and methods described herein, once a first set of data, timing information characterizing the first set of data, as measured by the first timing mechanism, and transmission time for the first set of data, as measured by the first timing mechanism are received at the second node, the receiving node may be configured for determining a transmission delay time for the first node, e.g., based on a difference between the transmission time and the timing information characterizing the first set of data. The receiving node may further be advantageously configured to utilize this transmission delay time to correlate timing information for the first set of data between respective timing mechanisms of the first and second nodes. In particular, the receiving node may be configured to determine a receiving time for the first set of data, as measured by a second timing mechanism for a second processor associated with the second node. The timing delay may then be subtracting from the receiving time to determine timing information characterizing the first set of data in the context of the second timing mechanism. Thus, the end result is that timing information for the first set of data is now known in the context of both the first and second timing mechanisms. This may enable, for example, for determining relative operational parameters, e.g., for ECUs, as between the first and second node, time correlating of the first set of data relative to another set of data, tracking changes in time-correlations between the first and second nodes to determine relative clock drift, etc. The following sections of the disclosure provides additional example implementations of the above described systems and methods.

As noted above, the systems and methods described herein may be used to facilitate operations of an automotive radar system or other type of proximity detection system of a vehicle. FIG. 1 includes a schematic block diagram of an example automotive radar system 10, including one or more radar sensor modules 12 for processing automotive radar signals, in accordance with some exemplary embodiments. Referring to FIG. 1 radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein. In some embodiments, the RF signal transmit circuitry 20 may include an RF switch mechanism may rely on inputs from an RF oscillator included in RF signal generator 24. The RF signal transmit circuitry may further advantageously include pulse shaping circuitry, e.g., based on transmit antenna trigonometric calculations.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some embodiments, radar receive circuitry 22 may also include a receiver antenna select module for selecting the receive antenna from a plurality of receive antennas. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively, to generate I and Q intermediate frequency (IF) signals. In some embodiments mixing may further be based on pulse shaping of the RF signal from the RF signal generator 24 based on receive antenna trigonometric calculations. The resulting IF signals are further filtered as required by filtering circuitry 32 to generate filtered IF I and Q signals, labeled "I" and "Q" in FIG. 1. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10.

It will be understood that the system configuration illustrated in FIG. 1 is exemplary only and that other system configurations can be used to implement the embodiments described herein. For example, the ordering of filtering of the IF signal and analog-to-digital conversion may be different than the order illustrated in FIG. 1. The IF signal may be digitized before filtering, and then digital filtering may be carried out on the digitized signal(s). In other embodiments, the entire IF stage may be removed so that the RF signal is directly converted to DC for further digitizing and processing.

Figure 2:
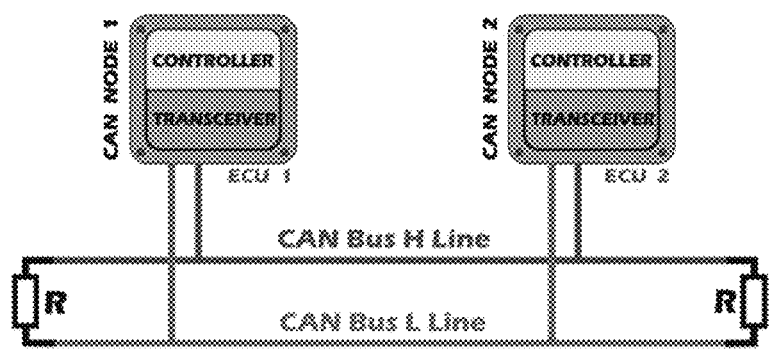
FIG. 2 depicts an example CAN bus, according to the present disclosure.

A typical bus used in a vehicle is the CAN bus, as illustrated by FIG. 2. In this example, there are two communication nodes, CAN Node 1 and CAN Node 2, providing the data communications between nodes. Each CAN node consists of a controller and a transceiver. The controller is responsible for implementing the CAN-bus communications protocol, while the transceiver is responsible for transmitting and receiving electrical signals on the CAN bus. Information is conveyed from one communications node to another communications node on the bus through the transmission and reception of CAN messages. Every CAN message includes both header data and payload data. The header data includes a message identifier, which both identifies uniquely the message and also determines the priority of the message, i.e., a message having a smaller-valued message identifier has higher priority than a larger-valued message identifier. The payload data, which consists of zero to 8 bytes, conveys the information needed by the processor connected to the receiving communications node. The format and meaning of the payload data is known to the processors that generate and/or consume the payload data, but otherwise do not affect further details of CAN-bus protocol. A processor, connected to the CAN controller and needing to transmit a CAN message, is responsible for determining the contents of the payload data and providing this information, along with the message identifier, to the CAN controller. If a message is currently being transmitted on the bus, however, the CAN controller must delay transmission on the bus until completion of that message, regardless of the relative priority of either message. If more than one CAN controller is waiting for completion of message transmission, however, then the waiting CAN controllers implement a collision-less protocol, e.g., involving the use of dominant and recessive bits, which always results in the waiting CAN message having the highest priority being transmitted next. It is noted that while FIG. 2 shows two wires in the CAN bus (which is typical for a high-speed CAN bus) other wiring configurations may also be used (e.g., many low-speed CAN busses typically use only one wire).

With continued reference to FIG. 2, in a first example, two ECU's (at CAN nodes 1 and 2, respectfully) have unsynchronized and potentially inaccurate clocks, but both participate on a common CAN bus. The first ECU creates or observes an event (e.g., the start of a signal transmission cycle for a first proximity sensor associated with the first ECU) for which the timing of the event needs to be communicated to the second ECU (e.g., so as to enable offsetting of a transmission cycle for a second proximity sensor associated with the second ECU). The first ECU may also capture a timestamp of that event derived from its clock.

In order to communicate the timing of the event to the second ECU, the first ECU transmits a first CAN message to the second ECU containing the event timestamp. The first ECU also captures a timestamp of when the first CAN message transmission on the bus has been completed. The first ECU then transmits a second CAN message to the second ECU containing the transmission-completion timestamp.

Upon reception of the first CAN message, the second ECU captures a timestamp of the message reception using its own clock. Upon reception of the second CAN message, the second ECU calculates the difference between the timestamp conveyed by the first message and the timestamp conveyed by the second message (i.e., the timestamps prepared by the first ECU). This timestamp difference is an estimate of the time duration between the event (e.g., sensor cycle start of the first ECU) and completion of transmission of the first CAN message. The second ECU can take the timestamp that it recorded upon receipt of the first message and subtract the timestamp difference in order to estimate the time of event occurrence with respect to its own clock.

Note that in some embodiments the first CAN message need not immediately be sent after an event. For example, suppose that the event occurs asynchronously and that the first ECU is only permitted to transmit on the CAN bus on one-second intervals. In this situation, the first ECU might send the first CAN message at the first one-second interval after the preparation of an event timestamp.

There are also many variations of the above-described example that can make it more suitable for various applications. In some implementations, the transmission of a second CAN message on the bus may not be desirable or possible. For example, the bus owner may have only allocated one CAN message ID and/or may not want an increase in bus loading provided by the overhead of a second CAN message. In this situation, the functionality of the second CAN bus message can be implemented by the first CAN bus message. In particular, each first CAN bus message would convey the timestamp of the current event, as well as the transmission-completion timestamp of the previous first CAN bus message.

In yet further implementations, it may not be desirable to allocate a CAN message ID simply for transmission of time synching information. In this situation, the functionality of the first and/or second CAN messages can be implemented through an existing CAN message having available capacity to transmit the needed timestamp value(s).

In further example implementations, the first and second ECUs may be configured so as to not participate directly on the same CAN bus. In this situation, there may be one or more gateway ECUs between the first and second ECU which serve to pass messages between CAN buses. Thus, in example embodiments the synchronization systems and methods described herein may be implemented individually for pairs of nodes along a communications chain, e.g., between a first ECU and a first gateway ECU, between each sequential pair of gateways ECUs (e.g., the first gateway ECU and a second gateway ECU, the second gateway ECU and a third gateway ECU, etc. down the line, until a final gateway ECU), and finally between the final gateway ECU and the second ECU.

In some implementations, the method of communications between one or more node pairs (e.g., between a first and second ECU) can be other than via a CAN bus. Indeed as discussed above, the systems and methods of the present disclosure are not limited to CAN bus implementations. Indeed, the systems and methods may be applied with respect to any type of communications network including, e.g., hybrid networks including a plurality of different communications protocols/modalities. In such cases, the specific implementations might be adapted according to the details of the particular communications protocol, e.g., in terms of how timing and event data is transmitted. In some embodiments, the systems and methods of the present disclosure may be applied with respect to a subset of nodes in a communications system. Thus, for example, for some node pairings it may not be necessary to calculate delay times, e.g., by reason that the communications delay variability is sufficiently small and/or its delay characteristics are sufficiently known.

In some embodiments, the accuracy in timing achieved by the systems and methods described herein may be primarily limited by the accuracy of obtaining the event and transmission-complete timestamps, as well as accuracy of each involved clock. It is noted that the accuracy of the event timestamp may depend on the nature of the event and details of how the timestamp is captured. For example, an event might be internally generated by a microprocessor timer on the ECU, and the event timestamp might be captured by executing microprocessor instructions to save the value of the clock into a memory buffer. In this case, there will be some variability in the initial servicing of the interrupt generated by the microprocessor timer, as well as a variable time delay due to execution of the microprocessor instructions. The accuracy of the transmission-complete timestamp may depend on the hardware and method implemented to recognize this occurrence. For example, the triggering of an interrupt service routine may be used to capture the transmission-completion timestamp. In this case, there may be some variability in initial servicing of the generated interrupt, as well as a variable time delay due to execution of the microprocessor instructions associated with the interrupt service routine. An alternative implementation might be for the microprocessor to poll for the occurrence of the CAN message transmission-complete event. Thus, much of the time variability in the timestamp value might be attributed to the frequency in which the microprocessor checks for the transmission-complete event. In an alternative embodiment, the timestamp may be captured by hardware circuits, e.g., not requiring microprocessor action during collection of timestamp value, possibly reducing the delay and/or variability associated with timestamp collection.

The accuracy of the clock on each ECU microprocessor may also influences the overall accuracy of the event time that is experienced by the second ECU. In particular, accuracy may be heavily affected by how long in the past the event occurred. For example, suppose that the first and second ECU both have low-cost crystal clocks with 50 ppm (parts per million) accuracy and communicate on a CAN bus through a single CAN message transmitted every one second. In the worst case, the event timestamp will be communicated on the CAN bus one second after the event and the corresponding transmission-completion timestamp will be communicated two seconds after the event. The clock of the first ECU is responsible for measuring the time between the event and the first CAN message transmission, which might have an error as large as 0.05 ms due to the 50 ppm clock accuracy (i.e., =1 sec×50/1E6). The clock of the second ECU is responsible for measuring the time between the first CAN message transmission and the use of the event time. The event time cannot be calculated before the second CAN message is received, so this duration is at least 1 second, with the second ECU thus adding an additional timing error of 0.05 ms. In this example, the worst-case timing error due to clock accuracies will be the sum of these two errors, or 0.1 ms, which is not a significant portion of our notional synchronization accuracy budget of +/−0.5 ms.

Figure 3:
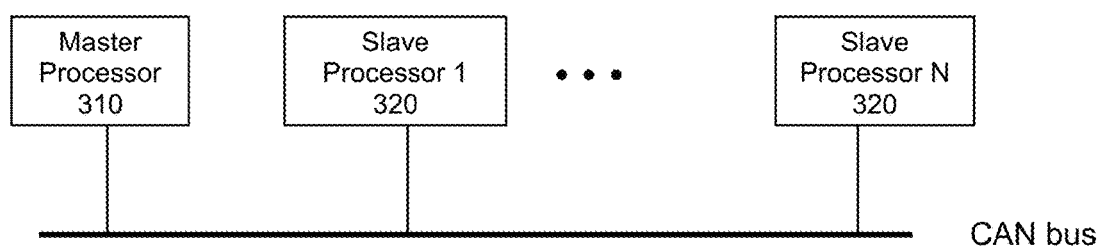
FIG. 3 illustrates an exemplary implementation of addressing clock drift, according to the present disclosure.

The impact of compounding loss of accuracy over time can be somewhat mitigated by utilizing the systems and methods described herein to characterize relative timing mechanism operations and detect/predict things like clock drift. FIG. 3 illustrates an exemplary implementation of addressing clock drift via the systems and methods disclosure herein. In this case, the master 310 and/or slave processors 320 may have clocks of insufficient quality to measure time with respect to each other with sufficient accuracy. In particular, the clocks may drift relative to one another because some clocks will be running faster than others due to particulars of its exact fabrication, temperature, age, environment, etc. For this problem, it may be desirable to compensate for this clock drift. Thus, in example embodiments, a Master processor may convey some sequence of events determined by its timer, e.g., 100 ms ticks of its clock. In accordance with the present example, the Master processor may, output a CAN message at the rate of, e.g., one every 100 ms, where each CAN message contains a value indicating the delay of the previous CAN message transmission with respect to the intended clock tick event. Each Slave processor can then have both the opportunity to determine the timing offset of its clock with respect to each tick of the Master processor clock, and through analysis of the interval between ticks, determine the relative speed of its clock with respect to the Master processor clock. Each Slave processor may utilize this information to model a virtual clock which is both aligned and exhibits very little drift with respect to the Master Processor clock. This may advantageously enable execution of functionality requiring better alignment and/or less drift than could be otherwise be achieved without better precision clocks, which might be more expensive and/or require more benign environmental conditions than might be available. Note that low clock drift may become particularly important when the clocks would otherwise drift out of synchronization during a single tick interval.

Figure 4:
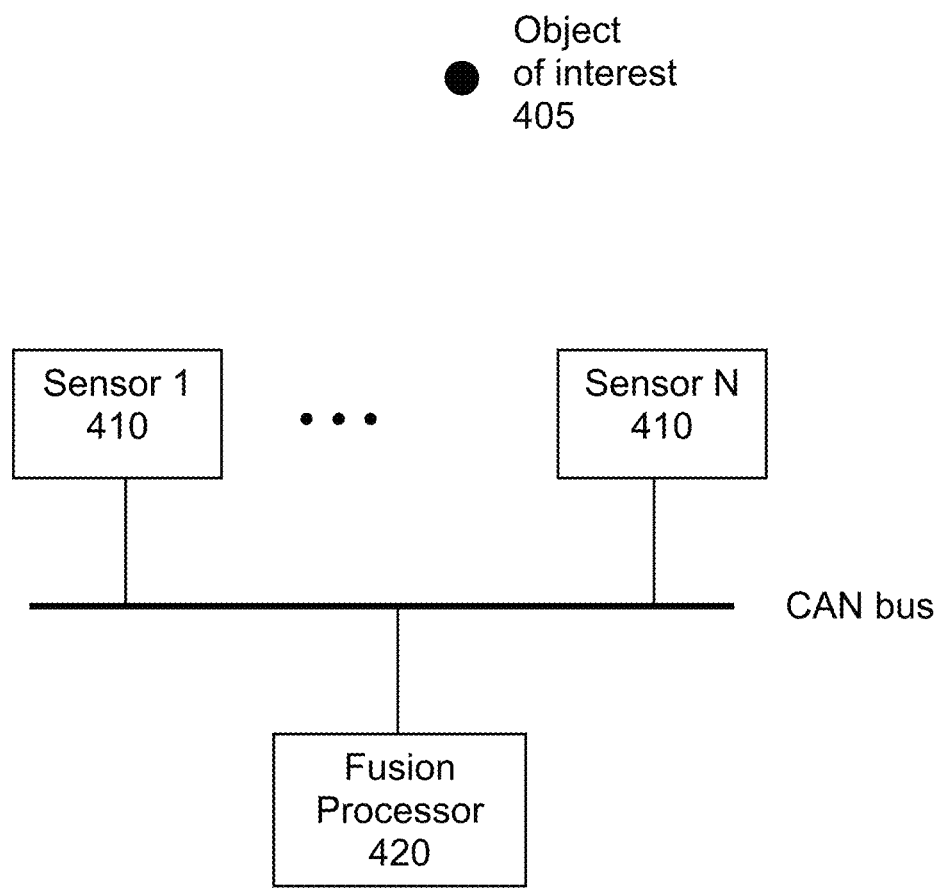
FIG. 4 illustrates an implementation for fusion processing of the time-correlated sensor data, according to the present disclosure.

As discussed above, in some embodiments, time-correlation of data as enabled by the systems and methods described herein may be utilized to facilitate analytic fusion thereof. FIG. 4 illustrates a sensor-fusion example. As depicted, there are N sensors 410 associated with a CAN (or other nondeterministic) bus. Each sensor communicates a list of observed (and/or tracked) objects to a Fusion processor 420. The Fusion processor is responsible for taking all observations from all sensors 410 and determining a single list of observed objects 405. Given that the sensors are not aligned in their cycle time and/or perhaps might even have different cycle time lengths, the movement of objects with respect to the sensors introduces errors into fusion process. The subject invention provides a means for the fusion processor to estimate the cycle timing of each sensor over the non-deterministic bus, so that this source of fusion error can be reduced or eliminated. Please note the sensors can be connected to the Fusion processor over one or more non-deterministic busses. e.g., a first sensor could be connected to the fusion processor over a dedicated CAN bus, while the rest of the sensors can be connected to the fusion processor through another LIN bus, etc.

Figure 5:
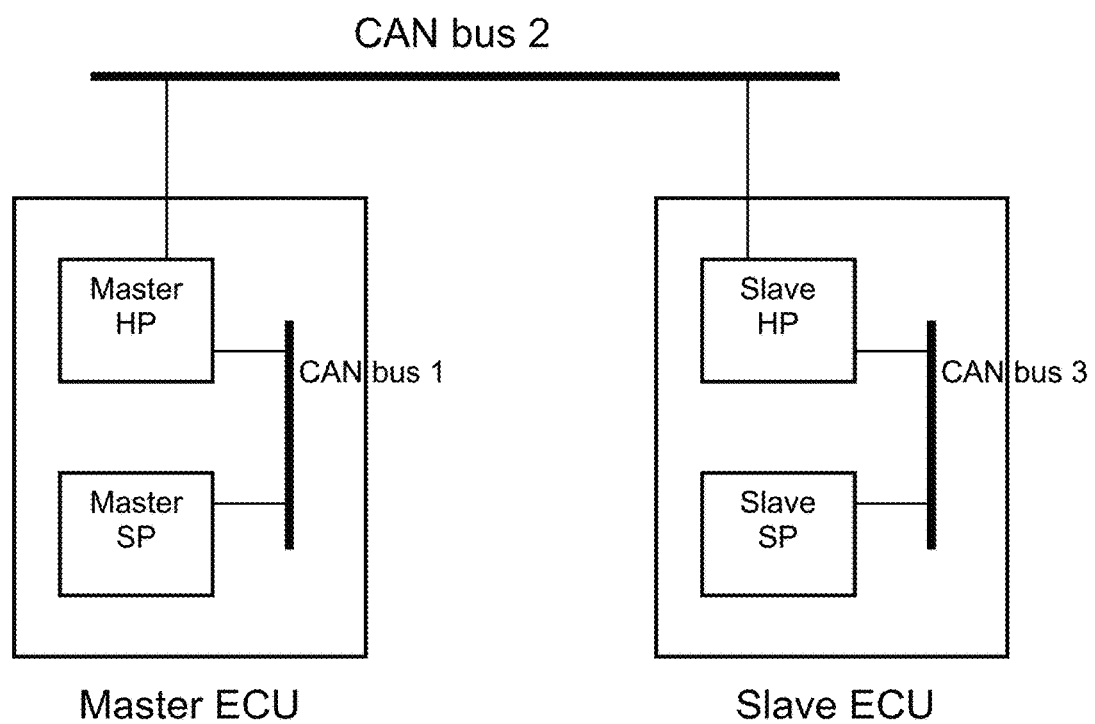
FIG. 5 illustrates an example configuration of ECUs, according to the present disclosure.

FIG. 5 illustrates an exemplary configuration of ECUs for implementation of cycle-timing knowledge. In the figure, a Master ECU communicates with a Slave ECU over a CAN bus 2. The Master ECU includes two processors, Master Host Processor (HP) and Master Signal Processor (SP), capable of communicating with each other over an internal CAN bus 1. The Master SP is responsible for setting the cycle timing of the Master ECU radar sensor. The Slave ECU includes two processors, Slave HP and Slave SP, capable of communicating with each other over an internal CAN bus 3. The Slave SP is responsible for setting the cycle timing of the Slave ECU radar sensor. In this exemplary example, the Slave SP obtains knowledge of the cycle timing implemented by the Master SP through communications over CAN bus 1, CAN bus 2, and CAN bus 3, so that the cycle timing of the Slave ECU has an appropriate relationship with respect to the cycle timing of the Master ECU.

Figure 6:
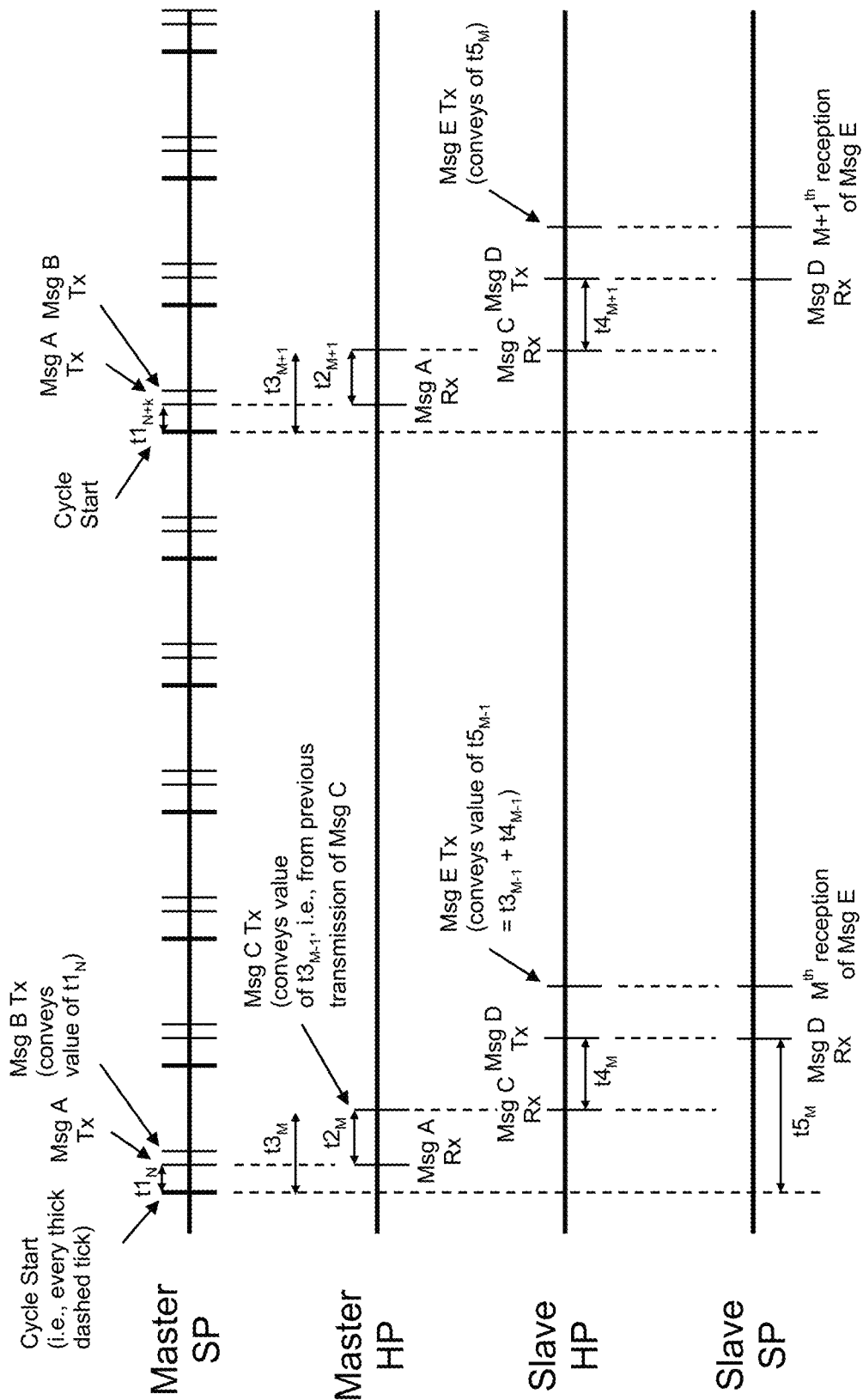
FIG. 6 illustrates an example timing diagram describing the transfer of cycle-timing knowledge, per the example configuration in FIG. 5.

FIG. 6 illustrates an example timing diagram describing the transfer of cycle-timing knowledge from the Master SP to the Slave SP in accordance with the subject invention disclosure. Each horizontal line in FIG. 6 provides the timeline for the indicated processor, i.e., Master SP, Master HP, Slave HP, or Slave SP. Each tick in a timeline indicates the occurrence of an event, such as the start of a cycle, or the arrival of a CAN message. The Master SP implements a periodic cycle, of which the start of each cycle is indicated by the thick dashed tick on the Master SP timeline. After the start of each cycle, the Master SP transmits a CAN bus Message (Msg) A on CAN bus 1. The Master SP captures a timestamp upon completion of the transmission of Msg A on CAN bus 1, which is used to calculate a value, t1, which is the time duration between the most recent cycle start and the transmission of the most recent Msg A on CAN bus 1. The Master SP transmits this value, i.e., t1, to the Master HP through CAN bus Msg B. The Master HP repeats this process after the start of every cycle. The value, t1N, denotes the timing value associated with the Nth cycle of the Master SP. In this exemplary example, a new cycle is started by the Master HP every 80 milliseconds. Please note all references to transmission and reception times of CAN bus messages actually refers to the time of completion of CAN bus message transmission and reception, respectively.

The Master HP transmits Msg C on CAN bus 2. In this exemplary example, Msg C is transmitted once per second. The Master HP calculates a t2, which is the time duration between the transmission of Msg C and the most recently received Msg A. Msg C is used to convey a value, t3, to the Slave HP, which is calculated as the addition of t1 and t2. Since the Master HP does not know the actual transmission time of Msg C at the time of message preparation, Msg C is used to convey the value of t3 corresponding to the previous transmission of Msg C. For example, the M+1th transmission of Msg C conveys the value of t3 corresponding to the Mth transmission of Msg C.

The Slave HP collects a timestamp upon the receipt of each Msg C transmitted from the Master HP over CAN bus 2. After each received Msg C, the Slave HP transmits Msg D on CAN bus 3. The Slave HP calculates a t4, which is the time duration between the receipt of Msg C and the transmission of Msg D. Next, the Slave HP transmits a Msg E on CAN bus 3, which conveys the value t5. The Slave HP calculates the value of t5 as the addition of t3 and t4. Since the value of t3 received over the most recently received Msg C conveys the value associated with the previous transmission of Msg C, the Slave HP must calculate the t5 value using previous values of t3 and t4. For example, the Mth transmission of Msg E conveys t5M−1, which is calculated as the addition of t3M−1 and t4M−1.

The Slave SP collects a timestamp upon receipt of each Msg D received over CAN bus 3. Next, the Slave SP receives Msg E over CAN bus 3, which conveys the timing value, t5M−1. Therefore, the Slave SP must wait until the next reception of Msg E over CAN bus 3 in order to obtain the timing value, t5M. It is now evident to the Slave SP that the Master SP had a cycle start with timing of t5M before the timestamp associated with the Mth reception of Msg D.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A system for synchronizing processor operations over a vehicle-related communication network, the system comprising:

a first communication node associated with a first processor characterized by a corresponding first timing mechanism; and a second communication node associated with a second processor characterized by a corresponding second timing mechanism;

wherein at least one of the first and second communication nodes of the vehicle-related communication network is associated with an embedded system in a vehicle;

wherein the first processor is configured to transmit data from the first communication node to the second communication node, wherein the transmitted data includes each of (i) timing information characterizing a first set of data, as measured by the first timing mechanism and (ii) a transmission time for the first set of data, as measured by the first timing mechanism; and wherein the second processor is configured to (i) receive the transmitted data and determine a receiving time for the first set of data, as measured by the second timing mechanism (ii) based on the timing information characterizing the first set of data in the context of the first timing mechanism and the transmission time for the first set of data, calculate a transmission delay time for the first set of data and (iii) based on the transmission delay time and the receiving time for the first set of data, determine timing information characterizing the first set of data in the context of the second timing mechanism, thereby correlating timing information for the first set of data between the first and second timing mechanisms.

2. The system of claim 1, wherein the vehicle-related communications network is a CAN or LIN bus, wherein the timing information characterizing the first set of data is sent in a first communication between the first communication node and the second communication node, wherein the transmission time for the first set of data, is a transmission time for the first communication and wherein the transmission time for the first communication is sent in a second communication between the first communication node and the second communication node.

3. The system of claim 1, wherein the first set of data represents sensor data from a first sensor, wherein the determining the timing information characterizing the first set of data in the context of the second timing mechanism time-correlates the sensor data from the first sensor to sensor data from one or more additional sensors so as to enable fusion processing thereof and wherein the system is configured to implement fusion processing of the time-correlated sensor data from the first sensor and the one or more additional sensors.

4. The system of claim 1, wherein changes in the correlation of timing information between the first timing mechanism and the second timing mechanism are tracked over a plurality of communications so as to determine relative clock drift.

5. The system of claim 1, wherein the first set of data represents transmission cycle timing information for a first sensor, wherein the determining the timing information characterizing the first set of data in the context of the second timing mechanism enables comparing a transmission cycle for a second sensor relative to the transmission cycle of the first sensor, and wherein the system is configured to adjust the transmission cycles of one or more of the sensors in order to mitigate interference.

6. The system of claim 1, wherein the correlated timing information is utilized by the system to synch or otherwise control timing of a plurality ECUs across the communication network, so as to effect cooperative operation between the plurality of ECUs or so as to prevent interfering operation between the plurality of ECUs.

7. The system of claim 1, wherein the correlated timing information is utilized by the system to time-correlate data from a plurality of nodes.

8. The system of claim 1, wherein the correlated timing information is utilized by the system to time-correlating proximity detection data from a plurality of sensors.

9. The system of claim 1, wherein the correlated timing information is utilized by the system to evaluating the operation of one of the timing mechanisms and to compensate for such operation.

10. A method for synchronizing processor operations over a vehicle-related communication network the network including a first communication node associated with a first processor characterized by a corresponding first timing mechanism; and a second communication node associated with a second processor characterized by a corresponding second timing mechanism; wherein at least one of the first and second communication nodes of the vehicle-related communication network is associated with an embedded system in a vehicle, the method comprising:

transmitting data from the first communication node to the second communication node, wherein the transmitted data includes each of (i) timing information characterizing a first set of data, as measured by the first timing mechanism and (ii) a transmission time for the first set of data, as measured by the first timing mechanism;

receiving the transmitted data at the second node and determining a receiving time for the first set of data, as measured by the second timing mechanism;

based on the timing information characterizing the first set of data in the context of the first timing mechanism and the transmission time for the first set of data, calculating a transmission delay time for the first set of data; and based on the transmission delay time and the receiving time for the first set of data, determine timing information characterizing the first set of data in the context of the second timing mechanism, thereby correlating timing information for the first set of data between the first and second timing mechanisms.

11. The method of claim 10, wherein the vehicle-related communications network is a CAN bus, wherein the timing information characterizing the first set of data is sent in a first communication between the first communication node and the second communication node, wherein the transmission time for the first set of data, is a transmission time for the first communication and wherein the transmission time for the first communication is sent in a second communication between the first communication node and the second communication node.

12. The method of claim 10, wherein the first set of data represents sensor data from a first sensor, wherein the determining the timing information characterizing the first set of data in the context of the second timing mechanism time-correlates the sensor data from the first sensor to sensor data from a second sensor so as to enable fusion processing thereof and wherein the method further includes fusion processing of the time-correlated sensor data from a plurality of sensors including the first sensor and the second sensor.

13. The method of claim 10, wherein changes in the correlation of timing information between the first timing mechanism and the second timing mechanism are tracked over a plurality of communications so as to determine relative clock drift.

14. The method of claim 10, wherein the first set of data represents transmission cycle timing information for a first sensor, wherein the determining the timing information characterizing the first set of data in the context of the second timing mechanism enables comparing a transmission cycle for a second sensor relative to the transmission cycle of the first sensor, and wherein the method further includes adjusting the transmission cycles of one or more of the sensors in order to mitigate interference.

15. The method of claim 10, wherein the correlated timing information is utilized to synch or otherwise control timing of a plurality ECUs across the communication network, so as to effect cooperative operation between the plurality of ECUs or so as to prevent interfering operation between the plurality of ECUs.

16. The method of claim 10, wherein the correlated timing information is utilized to time-correlate data from a plurality of nodes.

17. The method of claim 10, wherein the correlated timing information is utilized to time-correlating proximity detection data from a plurality of sensors.

18. The method of claim 10, wherein the correlated timing information is utilized to evaluating the operation of one of the timing mechanisms and to compensate for such operation.

* * * * *